INVENTOR.
Harry L. Smith

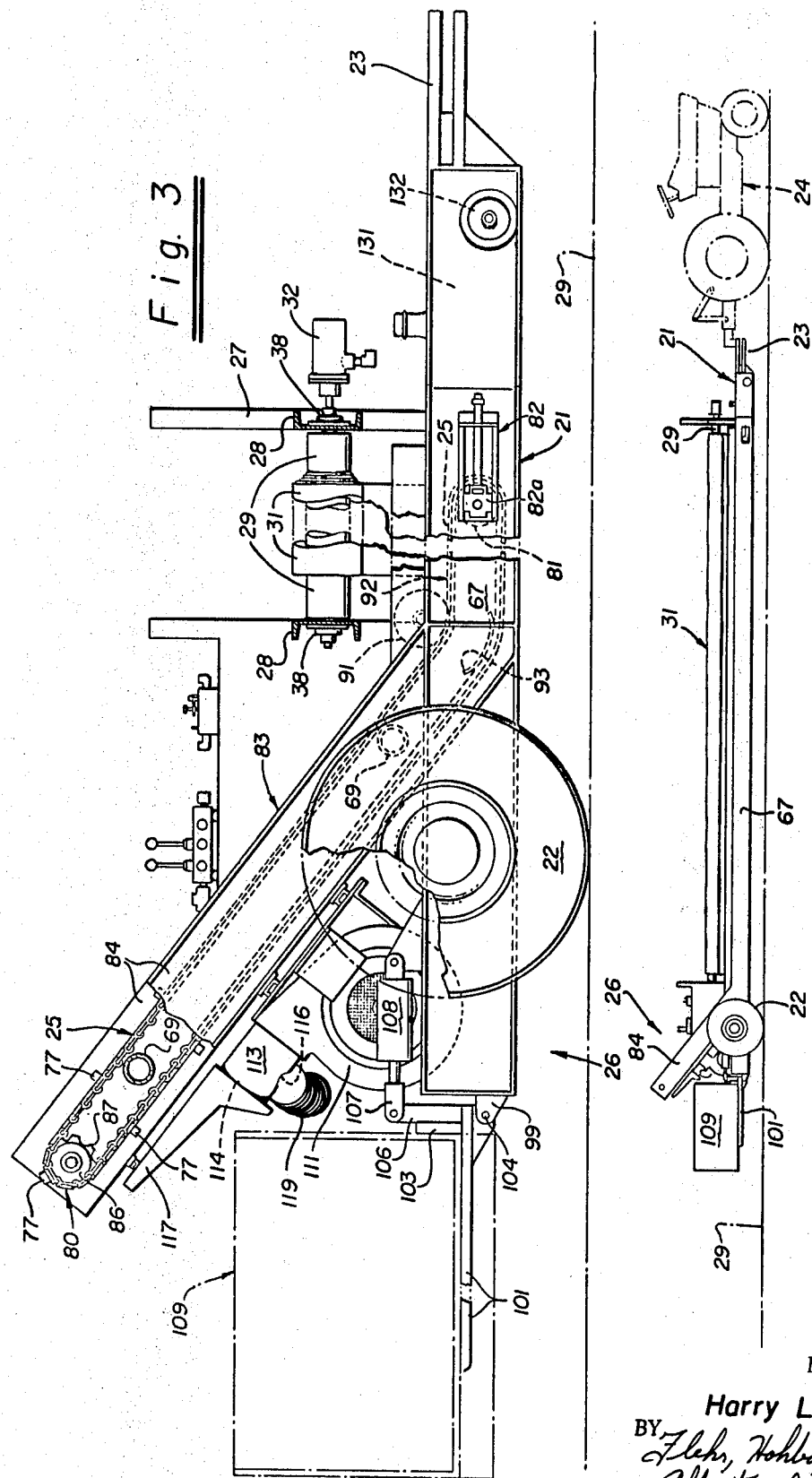

Oct. 27, 1970     H. L. SMITH     3,535,864
FRUIT CATCHING FRAME

Filed Feb. 4, 1969     5 Sheets-Sheet 3

INVENTOR.
Harry L. Smith
BY Flehr, Hohbach, Test, Albritton & Herbert
Attorneys

Oct. 27, 1970  H. L. SMITH  3,535,864
FRUIT CATCHING FRAME
Filed Feb. 4, 1969  5 Sheets-Sheet 4

INVENTOR.
Harry L. Smith
BY *Flehr, Hohbach, Test*
*Albritton & Herbert*
Attorneys

United States Patent Office 3,535,864
Patented Oct. 27, 1970

1

3,535,864
FRUIT CATCHING FRAME
Harry L. Smith, Ontario, N.Y., assignor, by mesne assignments, to AgMac Inc., Ripon, Calif., a corporation of Delaware
Filed Feb. 4, 1969, Ser. No. 796,494
Int. Cl. A01g *19/00*
U.S. Cl. 56—329                          6 Claims

ABSTRACT OF THE DISCLOSURE

Fruit catching and gathering apparatus including a framework supporting an elongate conveyor for transporting fruit to one end of the framework and a roll-supported, rectangular drape adapted to be laid on the ground under a tree to receive fruit shaken therefrom, the drape and roller being arranged so that the drape rolls up over the top of said roller into a compact form. A plurality of cleats are provided to limit the movement of fruit lying on the drape and prevent it from sliding or rolling off as the latter is rolled up. In this way, the drape serves as an area conveyor for carrying the fruit thereon over said roller where it drops to the elongate conveyor in the framework for collection. Specific embodiments utilizing an air cushion type drape and sheet type drape are disclosed.

BACKGROUND OF THE INVENTION

This invention relates to fruit catching and gathering apparatus, sometimes called catching frames, and in particular to such apparatus utilizing the ground supported drape as the catching and gathering elements.

Fruit catchers are commonly used in harvesting operations in which mechanical tree shakers are employed to shake the fruit out of the tree. Various types of fruit catchers are presently in use, some serving to catch the fruit and to provide for gathering it together. None has proved to be entirely satisfactory, especially with respect to the problem of gathering the fruit once it is caught. There is, therefore, a need for a new and improved fruit catching and gathering apparatus.

In general, it is an object of the present invention to provide a new and improved method and apparatus for catching fruit, employing a drape construction and arrangement, which will overcome the above-mentioned limitations and disadvantages.

A further object of the present invention is to provide for apparatus of the above character in which the drape, either air cushion or sheet, is utilized as an area conveyor for transporting the fruit so caught out from underneath the tree and into the catching frame.

Another object of the invention is to provide a method and apparatus of the above character by which harvested fruit can be removed from under the tree simultaneously with the operation of recovering the catching apparatus.

Another object of the invention is to provide an apparatus of the above character in which the fruit is conveyed from under the tree while it rests on the drape in substantially the location where it fell.

Another object of the invention is to provide an apparatus for catching fruit of the above character which is in the form of a single unit adapted to travel along a row of trees and to rapidly collect the fruit shaken off each tree.

Another object of the invention is to provide an apparatus of the above character which is relatively simple to operate and economical to manufacture.

In general, the fruit catching frame of the present invention utilizes a framework having an elongate conveyor. The framework is rolled into a position alongside a tree and a drape mounted on a roller connected over the elongate conveyor and the framework is unrolled and positioned underneath the tree. The drape may either be of an air cushion or sheet type and incorporates a plurality of cleats of resilient material extending in spaced parallel relation to the roller. After the fruit is caught from the shaking operation, the roller winds up the drape in such a manner that the drape follows over the top of the roller, the cleats carrying the fruit in the general position where it fell along the ground and up over the roller where the fruit is dumped onto the elongate conveyor. In this way, the drape itself serves as an area conveyor of fruit from underneath the tree to the elongate conveyor within the framework, greatly facilitating the collection and gathering of the fruit with a minimum of movement and handling.

These and other features and objects of the invention will appear from the following description and claims when taken in conjunction with the accompanying drawings.

BRIEF DESCRIPTION OF THE DRAWINGS

FIG. 2 is a side elevational view of the apparatus of FIG. 1 showing the drape collapsed and rolled up onto the apparatus.

FIG. 3 is an enlarged side elevational view of the apparatus of FIG. 2 with portions thereof broken away.

DESCRIPTION OF THE PREFERRED EMBODIMENT

Figure 1:
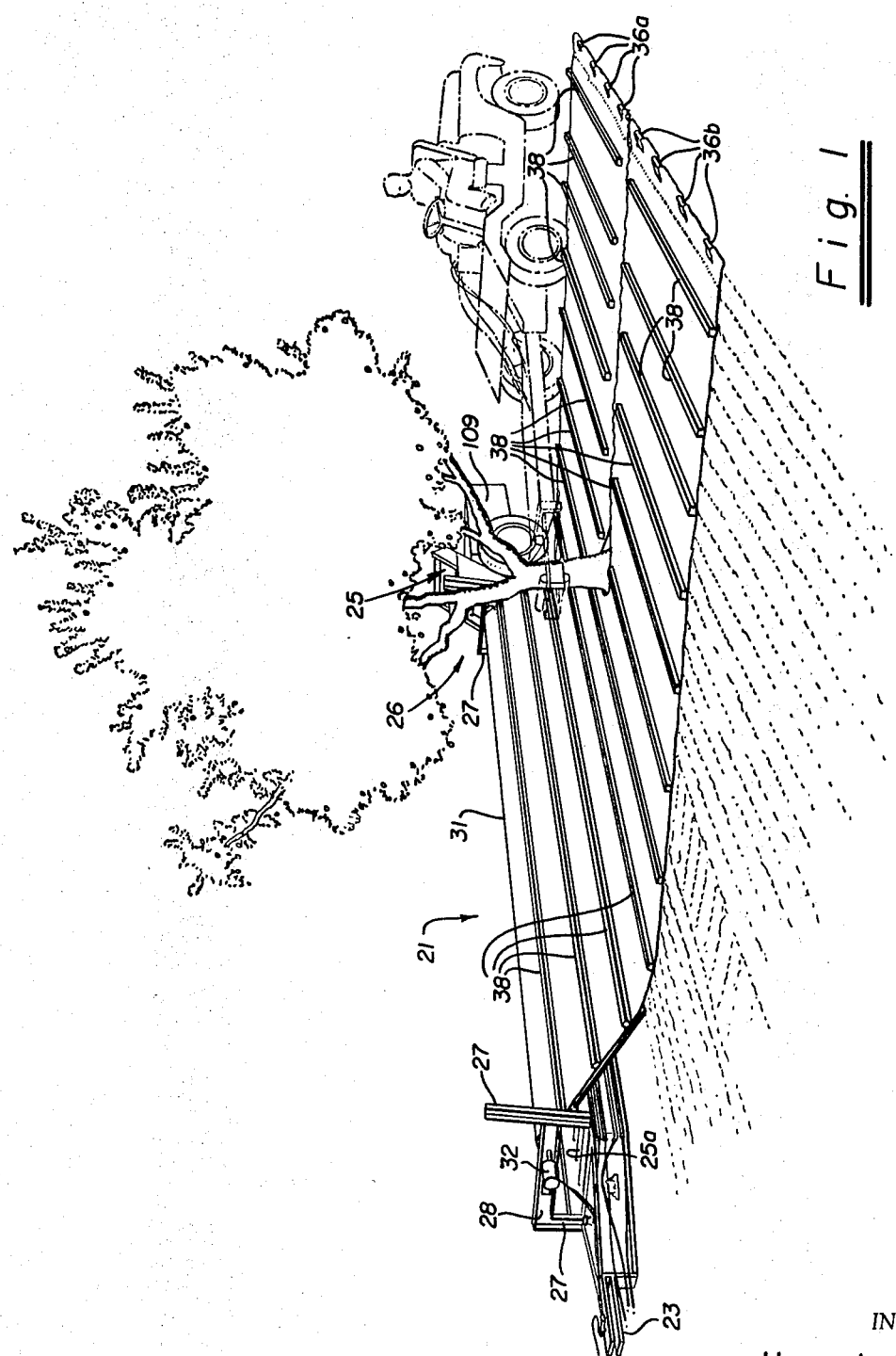
FIG. 1 is a perspective view of apparatus for catching fruit constructed in accordance with the invention and showing the drape and associated cleats in an extended position under a tree.

Referring to the figures, the fruit catching apparatus of the present invention includes towable trailer frame 21 supported at one end of wheels 22 and on the other end by hitch 23 welded to the frame and adapted to be attached to a towing vehicle such as a tractor 24. Frame 21 carries an elongate conveyor 25 including a flat bed portion 25*a* which serves to transport fruit in a linear stream to one end 26 of the frame where it is binned.

At each end of the flat bed of the elongate conveyor are attached a pair of uprights 27 each supporting a cross beam 28 extending above and bridging over conveyor 25. A drape roll 29 is mounted in bearings 30 secured between the beams and to span between the support beams in such a position that it is immediately above the elongate conveyor and is spaced therefrom a distance sufficient to permit a drape 31 to roll up completely on the roll without conflict with the conveyor or the fruit thereon. Suitable hydraulic motor 32 is provided for mechanically rolling and unrolling the roll, as will be described. A planar drape support slide 19 is hinged on one side of the frame and extends downwardly to the ground at such an angle and position for supporting the fruit loaded drape on its path from the ground to roll 29. Suitable linear actuators 20 are mounted between the lowerside of the frame and the outer edge of the side and serve to lift the slide during movement of the frame between trees.

DRAPE CONVEYOR

Figure 5:
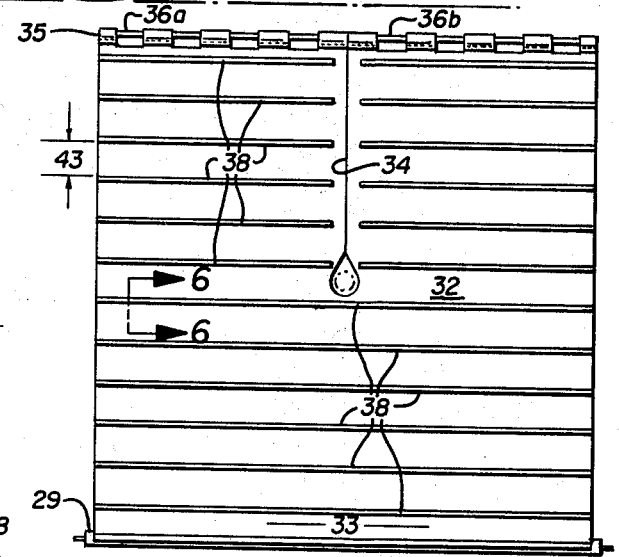
FIG. 5 is a top plan view of a fruit colecting drape of the apparatus of FIG. 1 and showing the same in fully extended position.
Figure 6:
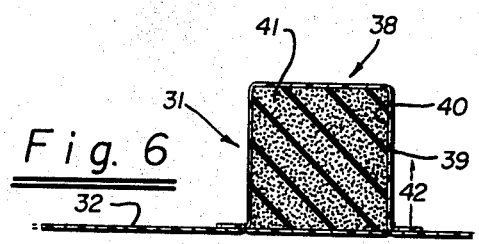
FIG. 6 is a cross sectional view taken along the lines 6—6 of FIG. 5.
Figure 7:
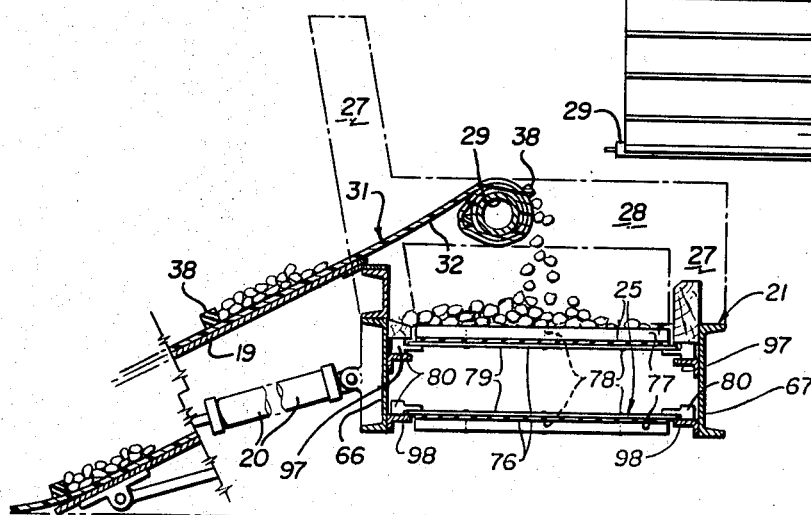
FIG. 7 is a cross sectional view of the apparatus utilizing the drape of FIG. 5 and showing the same partially rolled up and the manner in which the fruit is shifted thereby and transferred from the drape to the elongated conveyor in the frame.

Referring now to FIGS. 5 through 7, there is shown one form of drape 31 constructed in accordance with the invention and consists of a generally rectangular sheet 32, one side 33 of which is attached to the roll and is adapted to be rolled up so that the successive portions of the sheet are pulled over the upperside of the roll. Sheet 32 is provided with a slot 34 extending inwardly from the side opposite from the roll for permitting the sheet to be pulled about the tree which then is positioned at a midposition of the drape. Portions of the outer edge 35 of the drape are looped back to secure grab bars 36a, b which facilitates hand unrolling and manipulation into position about the tree.

Means are provided for forming a plurality of resilient cleats 38 attached in spaced parallel relation along the top of the drape. Cleats 38 are constructed and arranged to limit the motion or movement of fruit lying on the drape and to prevent the fruit from sliding or rolling off as the drape is moved. FIG. 6 illustrates the manner in which the cleats are formed for use with a sheet structure. Thus, each cleat includes a web 39 of suitable flexible material similar to the material of the sheet and sewn or otherwise attached thereto so as to form a hollow channel 40 running along the top of the sheet in parallel relation to the roll. The hollow channel is filled by an elongate resilient member 41, such as foamed elastomeric material having a square cross section so that a generally upright barrier 42 is presented toward the frame to prevent movement of fruit away from the direction of movement of the drape as the latter is pulled toward the frame. The height of this barrier is made large enough so that it is effective, even when the drape is highly loaded. For most fruit a height $h$ of about one inch is satisfactory and is easily achieved with a member of square cross section. The spacing 43 between cleats should range between about one to three feet, preferably from about 18 inches to 2 feet to assure an adequate number and prevent undue load on any one cleat.

Figure 9:
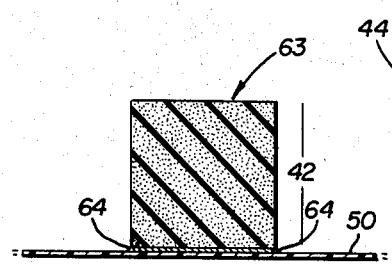
FIG. 9 is a cross sectional view taken along the lines 9—9 of FIG. 8.
Figure 8:
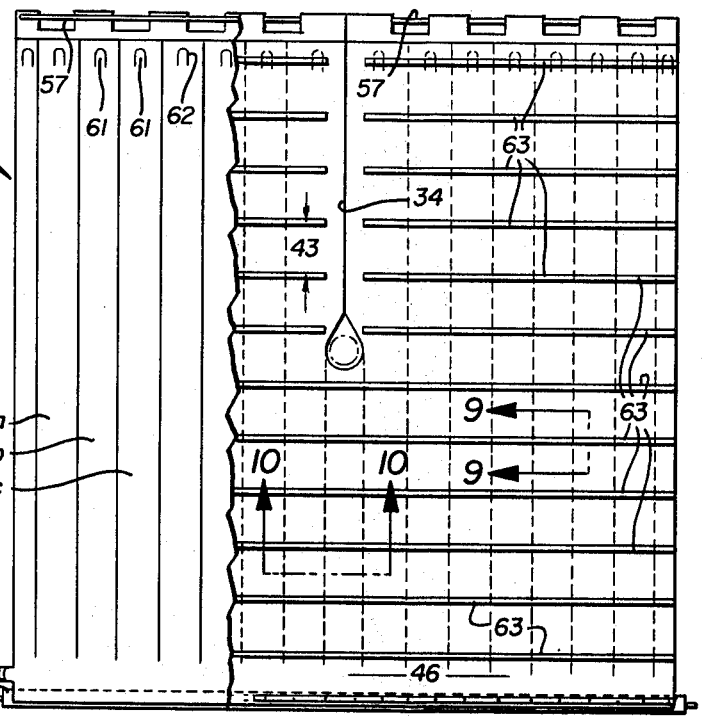
FIG. 8 is a top plan view partially broken away of an inflatable air cushion type drape constructed according to the invention for use in the apparatus of FIG. 1.
Figure 10:
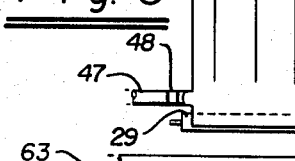
FIG. 10 is a cross sectional view taken along the lines 10—10 of FIG. 8.

Reference is made to copending application Ser. No. 599,132, entitled, "Method and Apparatus for Catching Fruit," filed in the names of Russell D. Gould and John E. Richter, in which an air cushion construction is disclosed for catching fruit. The present invention is applicable to such cushion structures as well as to a simple sheet. Referring to FIGS. 8 through 10, there is shown an air cushion drape 44 constructed in accordance with the present invention. The air cushion is constructed of a plurality of sections of materials secured together to form air channels 45a, b extending longitudinally away from the roll, the channels 45 are interconnected to an inlet plenum 46 which is common to all of the longitudinal channels of the cushion and serves to distribute air throughout the cushion. Means consisting of a flexible trunk 47 and inlet connector 48 is provided for releasably attaching the input of the air plenum to an air supply, to be described. The air cushion 44 is made up of upper and lower flexible walls 49, 50 interconnected by generally spaced parallel webs 51a, b . . . so that the spacing between the walls is controlled to a uniform depth when the cushion is inflated. All of the walls and webbing is preferably made by cloth-reinforced rubberized sheeting. The webs 51 terminate in spaced relation from the roll to form plenum 46.

The borders of the cushion are closed and sealed as by being sewn or otherwise secured together and the side adjacent roll 29 is suitably attached thereto, as with screws (not shown) so that the cushion can be rolled up over the top of the roll in the same manner as set forth in connection with the embodiment of FIGS. 5 through 7. Loops 56 are formed along the outer edge for receiving elongate rigid handles 57 which facilitate manual handling and positioning of the cushion.

Suitable vents are provided to permit air to pass out of the cushion 44 and comprise semicircular flaps 61 formed in the lower wall 49 preferably along the underneath of each channel and at the outer edge of the cushion. Such flaps 61 can take various forms but they are preferably made by curved, generally semicircular slits 62 cut so that the flap 61 formed thereby opens away from the roll. In this way, any remaining air is simultaneously expelled through the flaps as the cushion is rolled up, permitting the cushion to collapse so that it can take a compact form.

Means are provided for forming a plurality of spaced barriers to the movement of fruit about the cushion and comprises a plurality of cleats 63 spaced about and arranged parallel to roll 29. The size and spacing of cleats 63 are the same as previously discussed in connection with cleats 38. However, in order to avoid sewing through the cushion, it is preferred that cleats 63 be secured to the upper wall 50 with adhesive 64 which may be accomplished by vulcanizing or other techniques. Cleats 63 are preferably formed with a square cross section and are made of solid resilient elastomer.

ELONGATE CONVEYOR AND FRAME

Frame 21 includes elongate side members 66 and 67 supported at the front by a transverse frame member 68, along the length by transverse members 69, and at the rear by an axle 71, each of which is welded to the members 66 and 67. Axle 71 carries wheels 22 on spindles (not shown) rotatably mounted on kingpins 72. The direction taken by wheels 22 is controlled by an equal crank steering linkage 73 including a steering link 73a. A hydraulic actuator 74 is connected between steering link 73a and member 66 to provide full power steering and facilitate positioning of the apparatus.

Elongate conveyor 25 is mounted within the framework and consists of an endless belt 76 having spaced bars or lugs 77 secured to its outwardly facing surface by fasteners 78 passing through the bars 77 and belt 76 and secured to reinforcing strips 79 on its inner surface. Each side of belt 76 is provided with conveyor drive chains 80 secured to the strips 79.

A roller and sprocket assembly 81 is rotatably mounted in sliding blocks 82a which are part of a take-up frame 82 carried between members 66 and 67 at one end of frame 21. At the other end of frame 21 there is provided a riser frame 83 which forms an upwardly branching inclined extension of frame 21 overlying that end. Riser frame 83 includes supporting members 84 transversely secured therein. A roller 86 having sprockets 87 at each end is mounted at the upper end of riser frame 83 and is driven by a hydraulic motor 88. Belt 76 and the associated chains 80 are wound about roller 86 and the associated sprockets 87 so that the conveyor belt is in driving relationship therewith. The change in direction of the belt at the bottom of riser frame 83 is maintained by idler wheels 91 mounted on each side of the frame and over the upper run 92 of the belt and further by guide plates 93 mounted over the bottom run of the belt, as shown. As particularly shown in FIGS. 7 and 11, the chains 80 are supported for sliding motion along the length of the frame 21 on angles 97 and 98 secured along the inside of frame members 66 and 67.

Each of the side members 66 and 67 at the end of frame 21 beneath riser frame 83 carries rearwardly extending brackets 99. A pair of forks 101, 102 rigidly connected together by a member 103 is rotatably mounted into brackets 99 on pins 104. A lever 106 affixed to fork 101 is operatively connected to an arm 107 of a hydraulic linear actuator 108 mounted to the side frame member 67. As arm 107 is retracted, the forks 101, 102 are tilted upwardly to a generally horizontal position and serve to support a fruit receiving bin 109. When arm 107 is extended, forks 101, 102 are tilted backward and downwardly to permit bin 109 to slide off the apparatus and onto the ground.

AIR SUPPLY

Figure 4:
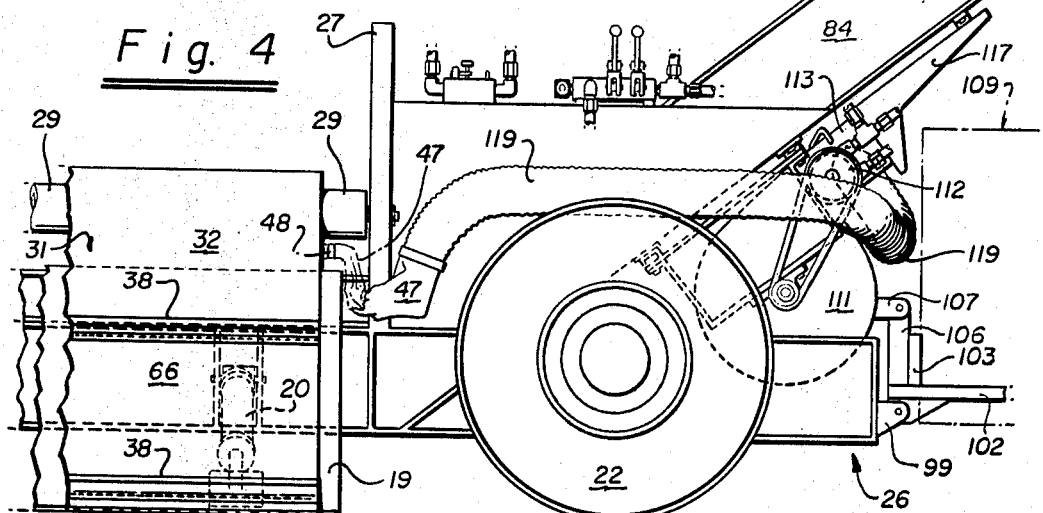
FIG. 4 is a side elevational view of the opposite side of the apparatus from FIG. 3 with certain portions thereof broken away.

Referring now to FIGS 3 and 4, a blower 111 driven by a hydraulic motor 112, is mounted to the underside of riser frame 83. The output of blower 111 is received by distribution in chamber 113 having two output openings 114 and 116. The chamber 113 contains a flap valve (not shown) which in one position directs the output of the blower upwardly through opening 114 and through a discharge nozzle 117 aimed across the path of the fruit as the latter drops off of the upper run 92 of the conveyor 25. In its other position, the flap valve directs the output through opening 116 and into a large diameter air duct 119 which is connected through a flexible duct 121 to the inlet connector 48 of the air cushion (FIGS. 8 through 10) when such is used. The position of the flap valve is controlled directly by lever 122 connected thereto and accessible on that side of the apparatus adjacent other control levers (FIG. 4).

HYDRAULIC POWER AND CONTROL CIRCUIT

The various actuators and motors hereinbefore described are powered from a single source of hydraulic fluid under pressure. Thus, a reservoir 131 of fluid is located at the front of the apparatus in the triangular section between support member 68 and the hitch 23. A filter 132 is located inside the reservoir 131 and its output is connected to a pump 133 which is located on the towing vehicle and is driven by suitable means thereon. Pump 133 supplies hydraulic fluid under pressure to a flow divider 134 from which the fluid passes to roller winding and steering control valve 136 and to conveyor, blower, and fork tilt control valve 137.

Valve 136 has two independent sections 136a, 136b, each of which is a three position valve of the type which permits high pressure to be supplied on either line connected thereto and which also possess a neutral position. Section 136a sends high pressure fluid through either of lines 138, 139 to the windup hydraulic motor of roller 37, the other of lines 138, 139 being a fluid return. The other section 136b supplies high pressure fluid to either of lines 141, 142 to the power steering actuator 74. For convenience, valve 136 is mounted on the towing vehicle so that the steering of the apparatus and windup of roller 37 can be easily and conveniently controlled by the driver.

The other output of the flow divider 134 is directed to valve 137 mounted near the rear of the apparatus and over the wheels 122. Valve 137 is divided into two sections, 137a, 137b, each of which is an independent three position reversing valve. Section 137a is connected through a continuously variable flow control 144 to the conveyor belt hydraulic drive motor 88 and the blower motor 112. Section 137b of valve 143 is connected to linear actuator 67 which operates the fork lift lever 106.

OPERATION

The operation of the above described apparatus is as follows. The frame is towed into position adjacent a tree to be shaken, the positioning being facilitated by manipulation of the control valve 136b and associated power steering unit 73, 74. When in appropriate position, control 136a is actuated to turn the motor in reverse and unreel the drape 31 off of the roll. Prior to this, the drape support plate has been lowered so that its outer end rests upon the ground. In the following description of the manner of operation, the use of the cleated drape 31 will be the same, whether it is constructed from an air cushion or a sheet, and the explanation of the cushion will therefore serve as the explanation of both, it being understood that the sheet is operated in the same way, only omitting reference to the air supply, associated connections, and controls.

Thereat the drape is then pulled and unrolled by manipulation of the handles 57 at the outer end and it is manipulated around the tree so that the latter slides through the slot until the drape is fully stretched out. The air cushion is then connected by coupling 48 to the air supply and inflated by actuating control valve 137a to power the blower 111 and by moving the flap valve 122 into a position so that air is blown through the ducting 119. Simultaneously with this operation, a tree shaker 120 is moved into position and operatively engages the tree (FIG. 1). After the cushion is at least partially filled, the air supply to the cushion can be terminated so that it remains under partial pressure and the fruit is shaken out of the tree. Coupling 48 to the bag is uncoupled after the fruit has fallen and before winding up the drape so that the same can be wound onto the roller without fouling or twisting.

Figure 11:
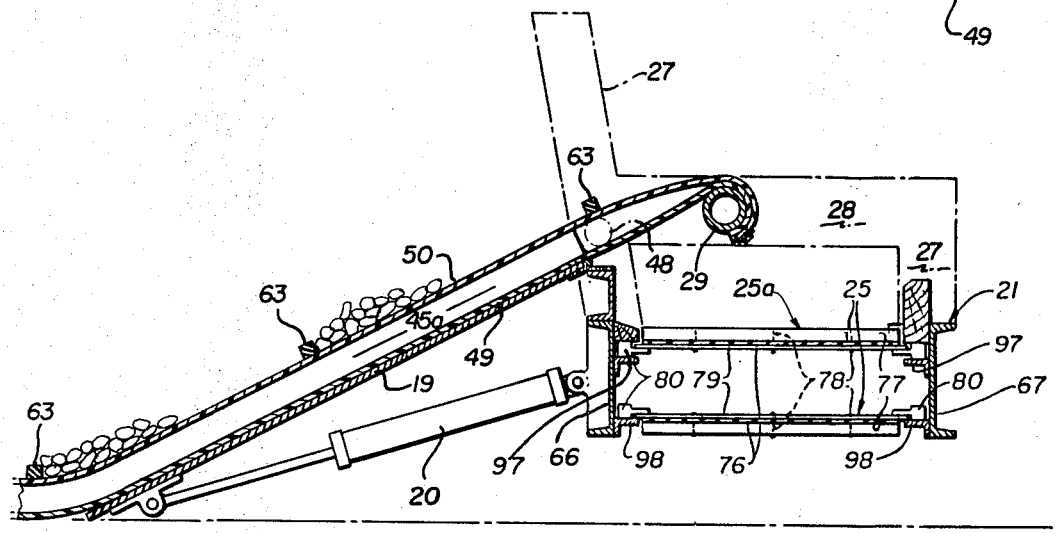
FIG. 11 is a cross sectional view of the apparatus similar to that of FIG. 7 and depicts the partially deflated air cushion drape as it is rolled up and the manner in which the fruit thereon is shifted to the elongate conveyor for collection.
Figure 12:
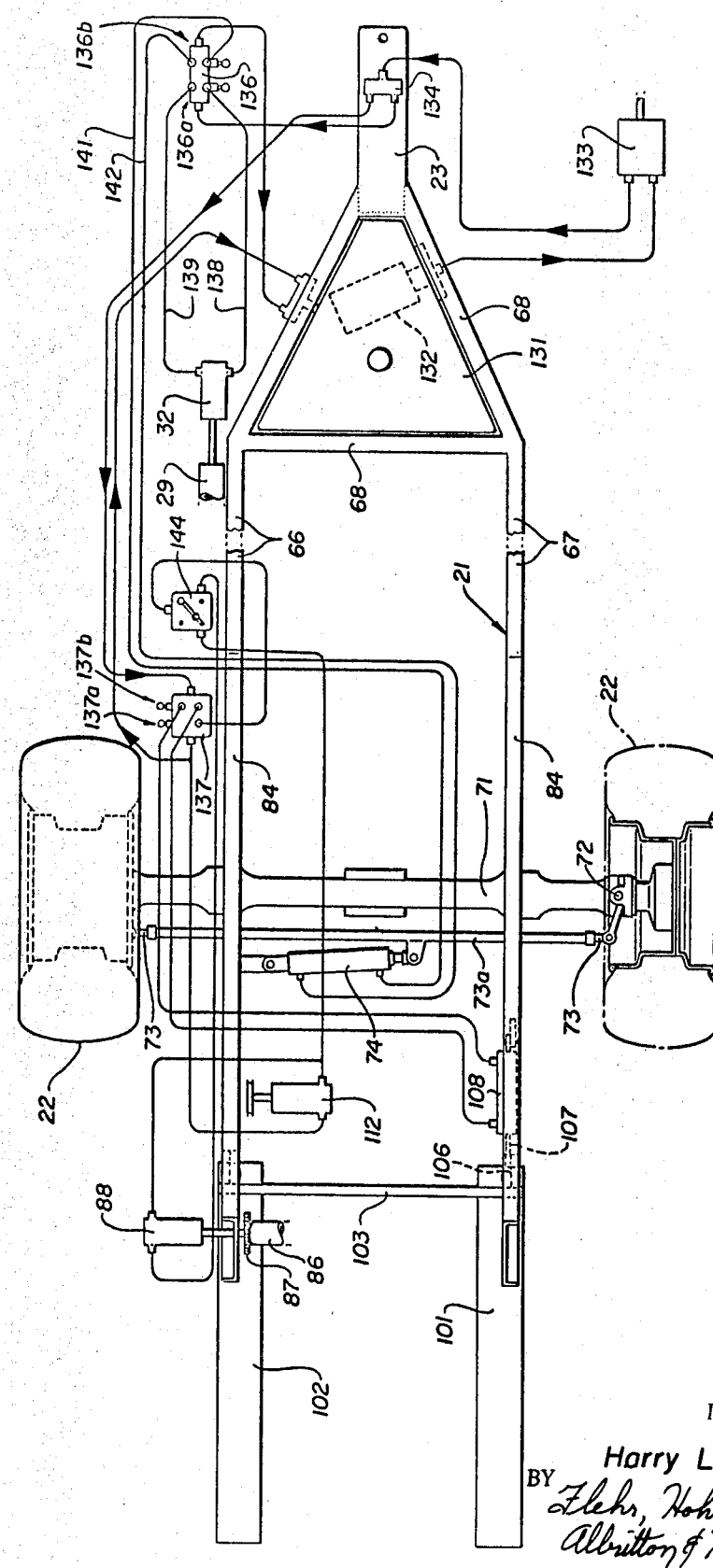
FIG. 12 is a plan view of the frame and supporting structure of the apparatus and showing in particular the associated hydraulic power and control mechanisms.

After the fruit has fallen, it lies in a random pattern on the drape, underneath the tree. By using elastomer cleats, no damage to the fruit is caused by dropping on cleats. The drape winding motor is then actuated to pull the drape toward the frame and over the top of the roll. This also drags the extended portions of the drape along the ground and toward the frame. In the process, the fruit is maintained in position by the cleats which form movement barriers that positively push the fruit toward the frame. When near the frame, the drape slides up the inclined surface of the support slide which directs the drape to the roll. As the fruit passes up over the top of the roll, the cleats continue to push the fruit and to maintain its position and forces the fruit over to fall onto the elongate conveyor within the frame. Any air remaining in the bag is automatically expelled through the vent flaps 61 at the outer end of the cushion by the squeezing action of the cushion in being rolled up (FIG. 11). The slide is then lifted by actuators 20 and the frame moved to the next tree.

After the fruit is dumped onto the conveyor, the unit is immediately ready to proceed on to the next tree. Meanwhile, the conveyor 24 is started with control valve 136b, the fruit being conveyed thereby to the rear of the apparatus and u pthe inclined riser frame 83 from which it drops into bin 109, and passes through the debris removing air blast from nozzle 117. Whenever bin 109 is filled with fruit the forks 101, 102 are tilted by operating control valve 137b and the bin is easily slid backwards onto the ground for later pickup and another bin is slid onto the forks and raised.

Thus, there has been provided a new and improved method and apparatus for catching fruit which is especially effective in gathering fruit shaken from trees. Moreover, the apparatus is simple and rapid in operation and provides complete fruit catching facility in a single, compact unit. Many modifications and adaptations of the invention will occur to those skilled in the art to which this invention pertains without departing from the spirit and scope of the invention. It should be understood, therefore, that the disclosure and description of apparatus herein are illustrative of the invention and are not to be taken as a limitation thereon.

What is claimed is:

1. In fruit catching apparatus for receiving fruit shaken from a tree, a framework, an elongate conveyor mounted in said framework and serving to transport fruit to one end of said frame, a generally rectangular flexible drape adapted to be rolled up and unrolled for positioning on the ground under said tree to receive the fruit shaken therefrom, a roll mounted above said elongate conveyor, one side of said sheet being fastened along said roll so that as the roll is operated, said sheet is rolled up over the top of said roll from the end adjacent the frame and the other portions of said sheet are pulled along the ground towards said frame, means forming a plurality of resilient cleats attached in spaced relation along the top of said drape, said cleats being constructed and arranged to limit the movement of fruit lying on said drape and prevent said fruit from sliding or rolling off of the drape as the latter is moved in being rolled up, said drape thereby serving an area conveyor from beneath the tree to the elongate conveyor on said frame, fruit being discharged from the top of the roller as the sheet is rolled thereon.

2. A fruit catching apparatus as in claim 1 wherein said drape consists of a sheet of material and in which said cleats consist of elastomeric material captured in a flexible channel attached to the top of said sheet.

3. A fruit catching apparatus as in claim 1 in which said cleats are spaced parallel to said roller and are located in a range from about 18 inches to 3 feet.

4. A fruit catching apparatus as in claim 1 in which said drape consists of a flexible air cushion having near connected upper and lower flexible walls extending over an area approximately as large as the area beneath the tree, said air cushion having an air inlet plenum adjacent said roller, means for supplying air under pressure to said cushion means to expand the same, means releasably interconnecting said air cushion to said blower so that the air cushion can be selectively connected when extended and disconnected while it is being unrolled and rolled up.

5. Fruit catching apparatus as in claim 1 further including a drape support slide forming an inclined planar surface extending from a position immediately adjacent and below said roller to a position on the ground removed from said frame to thereby support portions of said drape and fruit load, as the same is pulled toward said roll.

6. Fruit catching apparatus as in claim 5 further including means for hingedly mounting said drape slide on the frame for movement about an axis parallel to said roll, means interconnected between said frame and portions of said slide removed from the hinged side thereof for selectively lifting the outer edge of said slide off of the ground to thereby facilitate movement of said frame from tree to tree.

References Cited

UNITED STATES PATENTS

| | | | |
|---|---|---|---|
| 389,697 | 9/1888 | Fleming | 56—329 |
| 1,121,406 | 12/1914 | Satterberg | 56—329 |
| 2,473,327 | 6/1949 | Born | 56—329 |
| 3,347,032 | 10/1967 | Pool et al. | 56—329 |
| 3,462,931 | 8/1969 | Thayer | 56—329 |

RUSSELL R. KINSEY, Primary Examiner